United States Patent [19]

Inoue et al.

[11] Patent Number: 5,037,953

[45] Date of Patent: Aug. 6, 1991

[54] PROCESS FOR PRODUCING POLY (PARA-PHENYLENE-SULFIDE)

[75] Inventors: Hiroshi Inoue; Toshikazu Kato; Kensuke Ogawara, all of Mie, Japan

[73] Assignees: Tosoh Corporation, Mie; Toso Susteel Co., Ltd., Tokyo, both of Japan

[21] Appl. No.: 611,382

[22] Filed: Nov. 13, 1990

Related U.S. Application Data

[63] Continuation of Ser. No. 288,929, Dec. 23, 1988, abandoned.

[30] Foreign Application Priority Data

Dec. 24, 1987 [JP] Japan .............................. 62-325278
Feb. 15, 1988 [JP] Japan .............................. 63-30822

[51] Int. Cl.$^5$ .............................................. C08G 75/14
[52] U.S. Cl. ................................... 528/388; 524/609
[58] Field of Search ........................................ 525/388

[56] References Cited

U.S. PATENT DOCUMENTS

| | | | |
|---|---|---|---|
| 3,354,129 | 11/1967 | Edmonds, Jr. et al. | |
| 3,919,177 | 11/1975 | Campbell | 260/79.1 |
| 4,038,259 | 7/1977 | Campbell et al. | 260/79.1 |
| 4,064,114 | 12/1977 | Edmonds, Jr. | 260/79.1 |
| 4,089,847 | 5/1978 | Edmonds, Jr. et al. | 260/79.1 |
| 4,096,132 | 6/1978 | Edmonds, Jr. | 260/79.1 |
| 4,116,947 | 9/1978 | Edmonds, Jr. et al. | 528/388 |
| 4,324,886 | 4/1982 | Edmonds, Jr. et al. | 528/388 |
| 4,350,810 | 9/1982 | Tieszen et al. | 528/388 |
| 4,368,321 | 1/1983 | Sherk et al. | 528/388 |
| 4,371,671 | 2/1983 | Anderson | 528/388 |
| 4,740,569 | 4/1988 | Tieszen et al. | 528/388 |
| 4,794,161 | 12/1988 | Kato et al. | 528/388 |
| 4,794,163 | 12/1988 | Inoue et al. | 528/388 |

Primary Examiner—John C. Bleutge
Assistant Examiner—David W. Woodward
Attorney, Agent, or Firm—Sughrue, Mion, Zinn, Macpeak & Seas

[57] ABSTRACT

In a process for producing poly (p-phenylenesulfide) from an alkali metal sulfide and a p-dihalobenzene, a product polymer of an advantageously increased molecular weight is obtained by: providing a mixture comprising an alkali metal sulfide, a polar aprotic solvent and a carboxylic acid sodium salt represented by the general formula: ZCOONa (wherein Z is a $C_6$-$C_{20}$ aromatic hydrocarbon group or a substituted or unsubstituted pyridyl group

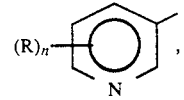

where substituents R, which may be the same or different, represent each a $C_1$-$C_{20}$ organic radical and n is an integer of from 0 to 4), the content of water present in said mixture apart from any water of hydration or crystallization which may be contained in said alkali metal sulfide and carboxylic acid sodium salt being at least 5 moles per mole of said alkali metal sulfide present; thermally dehydrating said alkali metal sulfide in said mixture by removing at least part of the water from said mixture; and then contacting the resulting dehydrated mixture with a p-dihalobenzene so as to produce the intended polymer.

10 Claims, No Drawings

PROCESS FOR PRODUCING POLY (PARA-PHENYLENE-SULFIDE)

This is a continuation of application Ser. No. 07/288,929 filed Dec. 23, 1988, now abandoned.

This invention relates to a process for producing poly (p-phenylenesulfide), more particularly, to a process for producing poly (p-phenylenesulfide) of increased molecular weight.

Poly (p-phenylenesulfide) has high resistance to heat and chemicals and use of it in electrical and electronic parts, as well as in automotive parts is drawing attention of researchers. This polymer can be injection-molded, extrusion-molded or otherwise molded into various shaped articles including films, sheets and fibers, and the resulting shaped articles find extensive use in applications where resistance to heat and chemicals is required.

One conventional method for producing poly (p-phenylenesulfide) consists of reacting a dihalo aromatic compound with an alkali metal sulfide such as sodium sulfide in a polar aprotic solvent (see Japanese Patent Publication No. 45-3368). However, the polymer produced by this method is too low in molecular weight to be usable in molding applications including injection molding. In order for this low-molecular weight polymer to be used in shaping and processing applications, it is conventionally crosslinked by thermal oxidation to increase its molecular weight. However, even this polymer having increased molecular weight has low adaptability for extrusion, probably due to the high degree of crosslinking and branching and substantial difficulty is involved in shaping it into films or fibers.

In an attempt to solve this problem, methods have been proposed for obtaining poly (p-phenylenesulfide) of increased molecular weight by polymerization reaction. A typical example of this approach is described in Japanese Patent Publication No. 52-12240 and consists of performing the intended polymerization reaction in the presence of R-COOM (R is a hydrocarbyl group and M is an alkali metal) which is used as a polymerization aid. Another method is described in our copending Japanese Patent Application No. 61-303655, in which the polymerization reaction is effected in the presence of a polymerization aid comprising an alkali metal salt of substituted or unsubstituted pyridine carboxylic acid represented by the formula:

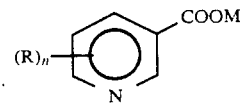

wherein substituents R represent each a $C_1-C_{20}$ organic group, M is an alkali metal and n is an integer of 0-4. The polymers of increased molecular weights obtained by these methods have high adaptability for extrusion molding and can effectively be formed into films, fibers and other shaped articles.

A problem with these methods, however, is that only expensive lithium salts used as polymerization aids will exhibit marked effectiveness in providing increased molecular weight and hence, the production cost is increased to a commercially unfeasible level. On the other hand, inexpensive sodium salts are inefficient to provide an intended increase in molecular weight unless a crosslinking agent such as a polyhalo aromatic compound containing at least 3 halogens in one molecule is added. However, not only does this intricate the operations in production process but also the resulting polymer is prone to gelation.

An object, therefore, of the present invention is to provide a process for producing poly (p-phenylenesulfide) of increased molecular weight by using a sodium salt of carboxylic acid that is at least comparable to lithium salts in its ability to increase the molecular weight of the polymer.

This object of the present invention can be attained by a process for producing poly (p-phenylenesulfide) which comprises:

providing a mixture comprising an alkali metal sulfide, a polar aprotic solvent, and a carboxylic acid sodium salt represented by the general formula: ZCOONa (where Z is a $C_6-C_{20}$ aromatic hydrocarbon group or a substituted or unsubstituted pyridyl group

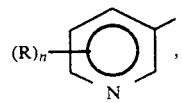

where substituents R, which may be the same or different, represent each a $C_1-C_{20}$ organic radical and n is an integer of from 0 to 4), the content of water present in said mixture apart from any water of hydration or crystallization which may be contained in said alkali metal sulfide and carboxylic acid sodium salt being at least 5 moles per mole of said alkali metal sulfide present;

thermally dehydrating said alkali metal sulfide in said mixture by removing at least part of the water from said mixture; and then contacting the resulting dehydrated mixture with a p-dihalobenzene so as to produce the intended polymer.

Generally, said at least 5 moles of water per mole of said sulfide is added to the mixture prior to the thermally dehydrating stage.

Examples of the carboxylic acid sodium salts (where Z is a $C_6-C_{20}$ aromatic hydrocarbon group) for use in the invention include sodium salts of benzoic, o-toluic, m-toluic, p-toluic, o-ethylbenzoic, cuminic, 4-N-propylbenzoic, 2,3,4-trimethylbenzoic, 2,3,4,5-tetramethylbenzoic, pentamethylbenzoic, 1-naphthoic, 2-naphthoic, anthracene-1-carboxylic, anthracene-2-carboxylic, anthracene-9-carboxylic, 4-phenylanthracene-1-carboxylic, phenanthrene-1-carboxylic, phenanthrene-2-carboxylic and phenanthrene-9-carboxylic acids, and mixtures of these salts.

Examples of the carboxylic acid sodium salts (where Z is a substituted or unsubstituted pyridyl group) for use in the invention include sodium salts of nicotinic, 2-methylnicotinic, 4-methylnicotinic, 5-methylnicotinic, 6-methylnicotinic; 2,4-dimethylnicotinic; 2,5-dimethylnicotinic; 2,6-dimethylnicotinic; 4,6-dimethylnicotinic; and 5,6-dimethylnicotinic acids, and mixtures of these salts.

The sodium salts of carboxylic acids for use in the present invention may be either anhydrous or hydrous. These salts are added in amounts that generally range from 0.05 to 4 moles, preferably from 0.1 to 2 moles, per mole of p-dihalobenzene. If the addition of the sodium salt of carboxylic acid is less than 0.05 moles per mole of p-dihalobenzene, the salt is not sufficiently effective to increase the molecular weight of the end polymer.

If the addition of the sodium salt of carboxylic acid is more than 4 moles per mole of p-dihalobenzene, troubles will occur such as difficulty in agitating the contents of the reactor. It is essential for the purpose of the present invention that the sodium salt of carboxylic acid should be present in the reaction system before the alkali metal sulfide is dehydrated.

In the method of the present invention, water is added to the reaction system before dehydration of the alkali metal sulfide and the water to be added should be free water which is clearly distinguished from the water of crystallization in alkali metal sulfides or salts of carboxylic acids. It is important for the purpose of the present invention that such "free water" should be present in an amount of at least 5 moles per mole of the alkali metal sulfide in the reaction system before dehydration. If such water is present in an amount of less than 5 moles per mole of the alkali metal sulfide, it is insufficient to enhance of ability of the sodium salt of carboxylic acid to increase the molecular weight of the end polymer. If a substantially large amount of free water, such as more than about 40 or 50 moles of free water is present per mole of the alkali metal sulfide, more energy is required to achieve dehydration of the alkali metal sulfide, which is disadvantageous from an economic viewpoint.

In order to enhance the ability of the sodium salt of carboxylic acid to increase the molecular weight of the end polymer, the alkali metal sulfide, polar aprotic solvent, sodium salt of carboxylic acid and the above-specified amount of water must be present simultaneously in the reaction system prior to dehydration of the alkali metal sulfide. The object of the present invention is achieved only when the alkali metal sulfide is dehydrated after these four components are incorporated in the reaction system.

Exemplary alkali metal sulfides for use in the present invention include lithium sulfide, sodium sulfide, potassium sulfide, rubidium sulfide, cesium sulfide and mixtures thereof. These sulfides or mixtures thereof may be used in the form of a hydrate. These alkali metal sulfides are prepared by reacting alkali metal hydrosulfides with alkali metal bases, or hydrogen sulfide with alkali metal bases. They may be prepared either in situ or outside of the reaction system before they are added to the system for polymerization of p-dihalobenzene. Among the alkali metal sulfides listed above, sodium sulfide is particularly preferred for use in the present invention.

Before adding p-dihalobenzene for polymerization, water is preferably removed from the reaction system by distillation or some other suitable method so that its content will be no more than about 4 moles per mole of the alkali metal sulfide. It is also possible to adjust the amount of water in the reaction system during the process of polymerization.

Illustrative p-dihalobenzenes that can be used in the present invention include p-dichlorobenzene, p-dibromobenzene, p-diiodobenzene and mixtures thereof, with p-dichlorobenzene being particularly advantageous. Other monomers may be copolymerized with p-dihalobenzene as long as their content is less than 30 mol % of p-dihalobenzene, and examples of such copolymerizable monomers include m-dihalobenzenes such as m-dichlorobenzene, o-dihalobenzenes such as o-dichlorobenzene, and dihalo aromatic compounds such as dichloronaphthalene, dibromonaphthalene, dichlorodiphenylsulfone, dichlorobenzophenone, dichlorodiphenylether, dichlorodiphenyl sulfide, dichlorodiphenyl, dibromodiphenyl and dichlorodiphenyl sulfoxide. If desired, polyhalo aromatic compounds containing at least 3 halogens in one molecule may also be employed in small enough amounts not to impair the linearity of the end polymer, and illustrative polyhalo aromatic compounds include trichlorobenzene, tribromobenzene, triiodobenzene, tetrachlorobenzene, trichloronaphthalene and tetrachloronaphthalene.

Polar solvents are preferably used as solvents for polymerization in the process of the present invention, and particularly preferred solvents are those which are aprotic and which are stable against alkalies at elevated temperatures. Exemplary solvents for polymerization include N,N-dimethylacetamide, N,N-dimethylformamide, hexamethyl phosphorylamide, N-methyl-ε-caprolactam, N-ethyl-2-pyrrolidone, N-methyl-2-pyrrolidone, 1,3-dimethylimidazolidinone, dimethyl sulfoxide, sulfolane, tetramethylurea, and mixtures thereof.

Polymerization of p-dihalobenzene is performed at 200°-300° C., preferably at 220°-280° C., for a period of 0.5-30 hours, preferably 1-15 hours, under agitation. The molar ratio of the alkali metal sulfide to p-dihalobenzene which are to be used in the process of the present invention is preferably in the range of from 1:0.9 to 1:1.1. Polar aprotic solvents may be used in such amounts that 3-60 wt %, preferably 7-40 wt %, of the polymer will be present in the mixture after polymerization.

The resulting poly (p-phenylenesulfide) may be recovered from the reaction mixture by any ordinary method, such as a method consisting of removing the solvent by distillation, flashing or some other suitable means, washing the polymer with water, and recovering it, or a method consisting of removing the solvent by filtering the reaction mixture, washing the polymer with water and recovering it. The second method is preferred since it imparts a minimum degree of thermal history to the polymer, thereby preventing coloration or gelation of the polymer.

The poly (p-phenylenesulfide) which is the end product of the process of the present invention must contain at least 70 mol % of

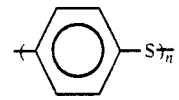

as the constituent units. It may also contain copolymerizable units if their content is less than 30 mol % of the polymer, and examples of such copolymerizable units include: m-phenylene sulfide unit

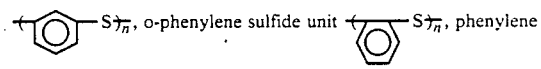

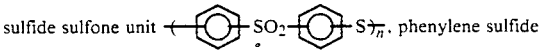

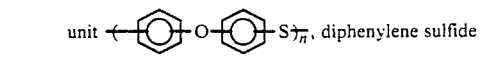

unit 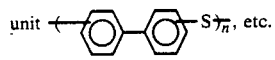$S )_{\overline{n}}$, etc.

The poly (p-phenylenesulfide) thus produced by the process of the present invention has its molecular weight increased in a linear form, so it is suitable for use as a material that is to be extrusion-molded into shaped articles such as fibers, films and tubes. If necessary, various additives may be incorporated in the polymer and illustrative additives include: ceramic fibers such as glass fibers, carbon fibers and alumina fibers; reinforcing fillers such as aramid fibers, totally aromatic polyester fibers, metal fibers and potassium titanate whiskers; inorganic fillers such as calcium carbonate, mica, talc, silica, barium sulfate, calcium sulfate, kaolin, clay, pyroferrite, bentonite, sericite, zeolite, nepheline syenite, attapulgite, wollastonite, ferrite, calcium silicate, magnesium carbonate, dolomite, antimony trioxide, zinc oxide, titanium oxide, magnesium oxide, iron oxide, molybdenum disulfide, graphite, gypsum, glass beads, glass powder, glass baloons, quartz, and silica glass; and organic or inorganic pigments.

Other additives that may be incorporated as required include plasticizers, mold release agents such as aromatic hydroxy derivatives, silane or titanate based coupling agents, lubricants, heat stabilizers, weather-proofing agents, nucleating agents, foaming agents, corrosion inhibitors, ion trapping agents, flame retardants and flame retarding aids.

If necessary, homopolymers, random copolymers, block copolymers and graft copolymers, either on their own or as admixtures, may be mixed with the poly (p-phenylenesulfide), and they include: polyethylene; polybutadiene; polyisoprene; polychloroprene; polystyrene; polybutene; poly-α-methylstyrene; polyvinyl acetate; polyvinyl chloride; polyacrylate esters; polymethacrylate esters; polyacrylonitrile; polyamides such as nylon 6, nylon 66, nylon 610, nylon 12, nylon 11, and nylon 46; polyesters such as polyethylene terephthalate, polybutylene terephthalate and polyarylate; polyurethane; polyacetal; polycarbonate; polyphenylene oxide; polysulfone; polyether sulfone; polyaryl sulfone; polyether ketone; polyether ether ketone; polyimide; polyamideimide; silicone resins; phenoxy resins; and fluorine resins.

The following examples are provided for the purpose of further illustrating the present invention but are in no way to be taken as limiting.

In the examples and comparative examples shown below, the melt viscosities of the samples of poly (p-phenylenesulfide) prepared were measured with a KOHKA-type flow tester (die, 0.5 mm$^\phi \times$2 mm$^L$) at 300° C. under a load of 10 kg.

EXAMPLE 1

A 500-ml autoclave was charged with 0.5 moles of sodium sulfide Na$_2$S.2.9H$_2$O, 125 ml of N-methyl-2-pyrrolidone (hereinafter abbreviated as NMP), 0.15 moles of sodium benzoate and 12.85 moles of distilled water. The temperature in the autoclave was raised to 200° C. with stirring under a nitrogen stream so as to distill off 247.0 g of water accompanied with 15.8 g of NMP. After cooling the system to 170° C., 0.5 moles of p-dichlorobenzene (hereinafter abbreviated as p-DCB) was added together with 42 ml of NMP and the system was closed under a nitrogen stream, followed by polymerization at 245° C. for 10 hours. After completion of the polymerization, the system was cooled and the contents were thrown into water. Following repeated cycles of washing with about 5 l of warm water and filtration, the residual cake was washed once with methanol and vacuum-dried with heating overnight to obtain small white granules of poly (p-phenylenesulfide). The polymer yield was 93% and its melt viscosity was 190 Pa.s (see Table 1).

EXAMPLES 2–9

Polymerization was performed as in Example 1 except that the molar ratio of Na$_2$S to p-DCB charged, the amount of water added (molar ratio of added water to Na$_2$S), the type of the sodium salt of aromatic carboxylic acid, the amount of its addition (molar ratio of ZCOONa to Na$_2$S), the polymerization temperature and time were changed as shown in Table 1. The results are also shown in Table 1.

COMPARATIVE EXAMPLE 1

Polymerization was performed as in Example 1 except that water was not added and that the molar ratio of Na$_2$S to p-DCB was 0.98. The resulting polymer was in the form of small granules; its yield was 94% and it had a melt viscosity of 73 Pa.s. This result shows that sodium benzoate used in the absence of water was not highly effective in increasing the molecular weight of the end polymer (see Table 1).

COMPARATIVE EXAMPLE 2

Polymerization was performed as in Example 1 except that water was added in an amount of 3 moles per mole of sodium sulfide. The resulting polymer was in the form of small granules; its yield was 93% and it had a melt viscosity of 90 Pa.s. This result shows that the ability of sodium sulfide to increase the molecular weight of the end polymer was not satisfactorily high when the amount of water added was less than 5 moles per mole of sodium sulfide (see Table 1).

COMPARATIVE EXAMPLE 3

Polymerization was performed as in Example 1 except that Na$_2$S.2.9H$_2$O was replaced by Na$_2$S.9H$_2$O and no water was added. The resulting polymer was in the form of small granules; its yield was 92% and it had a melt viscosity of 100 Pa.s. This result shows that the water of crystallization present in the polymerization system did not contribute much to the increase in the molecular weight of the end polymer (see Table 1).

COMPARATIVE EXAMPLE 4

Polymerization was performed as in Example 1 except that a mixture of sodium benzoate, water and NMP (containing no sodium sulfide) was heated at 200° C. to achieve partial dehydration and that thereafter, sodium sulfide was added to the system which was re-heated at 200° C. to achieve dehydration. The resulting polymer was in the form of small granules; its yield was 92% and it had a melt viscosity of 114 Pa.s, which was lower than the values attained in Examples 1–8 (see Table 1).

COMPARATIVE EXAMPLE 5

Polymerization was performed as in Example 1 except that the sodium benzoate was introduced together with p-DCB and NMP into the system after completion of dehydration. The resulting polymer was in the form of small granules; its yield was 95% and it had a melt viscosity of 79 Pa.s, which was lower than the values attained in Examples 1–9 (see Table 1).

As Comparative Examples 1–5 show, the sodium salt of aromatic carboxylic acid is not highly effective in increasing the molecular weight of the end polymer if it is not present together with NMP, sodium sulfide and a specified amount of water in the reaction mixture to be dehydrated. The advantages of the present invention can be achieved only when the mixture containing the above-specified components is dehydrated.

obtain small white granules of poly (p-phenylenesulfide). The polymer yield was 93% and its melt viscosity was 211 Pa.s (see Table 2).

EXAMPLES 11–14

Polymerization was performed as in Example 1 except that the amount of water added (molar ratio of added water to $Na_2S$), the type of the sodium salt of carboxylic acid, the amount of its addition (molar ratio of ZCOONa to $Na_2S$), the polymerization temperature

TABLE 1

| | $Na_2S$ | $Na_2S/$ p-DCB (molar ratio) | Added Water/$Na_2S$ (molar ratio) | $H_2O/Na_2S$ molar ratio after dehydration | ZCOONa | ZCOONa/ $Na_2S$ (molar ratio) | Polymerization temperature (°C.) | Polymerization time (hr) | Yield (%) | Melt viscosity (Pa.s) |
|---|---|---|---|---|---|---|---|---|---|---|
| Ex. 1 | $Na_2S.2.9H_2O$ | 1.00 | 25.7 | 1.1 | sodium benzoate (anhydrous) | 0.30 | 245 | 10 | 93 | 190 |
| Ex. 2 | " | 1.02 | 25.6 | " | sodium benzoate (anhydrous) | " | " | 5 | 94 | 172 |
| Ex. 3 | " | " | " | 1.0 | sodium benzoate (anhydrous) | " | " | 10 | 92 | 208 |
| Ex. 4 | " | 1.00 | " | 1.1 | sodium benzoate (anhydrous) | " | " | 20 | " | 177 |
| Ex. 5 | " | " | 28.9 | 1.8 | sodium benzoate (anhydrous) | 0.50 | " | 10 | 93 | 197 |
| Ex. 6 | " | " | 36.0 | 2.4 | sodium benzoate (anhydrous) | 1.00 | " | " | 95 | 152 |
| Ex. 7 | " | " | 25.6 | 1.4 | sodium benzoate (anhydrous) | 0.30 | 250 | 5 | 94 | 147 |
| Ex. 8 | " | " | " | 1.3 | sodium benzoate (anhydrous) | " | " | 10 | 93 | 176 |
| Ex. 9 | " | " | 32.3 | 1.2 | sodium m-toluylate (anhydrous) | " | 245 | " | 94 | 167 |
| Comp. Ex. 1 | " | 0.98 | 0 | 1.1 | sodium benzoate (anhydrous) | " | " | " | " | 73 |
| Comp. Ex. 2 | " | 1.00 | 3.0 | 1.2 | sodium benzoate (anhydrous) | " | " | " | 93 | 90 |
| Comp. Ex. 3 | $Na_2S.9H_2O$ | " | 0 | " | sodium benzoate (anhydrous) | " | " | " | 92 | 100 |
| Comp. Ex. 4*1 | $Na_2S.2.9H_2O$ | " | 15.7 | 1.4 | sodium benzoate (anhydrous) | " | " | " | " | 114 |
| Comp. Ex. 5*2 | " | " | 25.6 | 1.1 | sodium benzoate (anhydrous) | " | " | " | 95 | 79 |

*1 A mixture of sodium benzoate, $H_2O$ and NMP was dehydrated by heating, followed by addition of $Na_2S$ and re-heating for dehydration.
*2 After dehydration of $Na_2S$, sodium benzoate was added together with p-DCB and NMP.

EXAMPLE 10

A 500-ml autoclave was charged with 0.5 moles of sodium sulfide $Na_2S.2.9H_2O$, 125 ml of NMP, 0.15 moles of sodium nicotinate and 9.5 moles of distilled water. The temperature in the autoclave was raised to 200° C. with stirring under a nitrogen stream so as to distill off 186.2 g of water accompanied with 11.9 g of NMP. After cooling the system to 170° C., 0.50 moles of p-DCB was added together with 42 ml of NMP and the system was closed under a nitrogen stream, followed by polymerization at 245° C. for 10 hours. After completion of the polymerization, the system was cooled and the contents were thrown into water. Following repeated cycles of washing with about 5 l of warm water and filtration, the residual cake was washed once with methanol and vacuum-dried with heating overnight to and time were changed as shown in Table 2. The results are also shown in Table 2.

COMPARATIVE EXAMPLE 6

Polymerization was performed as in Example 10 except that water was not added and that polymerization consisted of two stages, the first stage being continued for 2 hours at 230° C. and the second stage continued for 2 hours at 265° C. The resulting polymer was in the form of granules; its yield was 96% and it had a melt viscosity of 110 Pa.s. This result shows that sodium nicotinate used in the absence of water was not highly effective in increasing the molecular weight of the end polymer (see Table 2).

COMPARATIVE EXAMPLE 7

Polymerization was performed as in Example 10 except that water was added in an amount of 3 moles per mole of sodium sulfide. The resulting polymer was in the form of small granules; its yield was 94% and it had a melt viscosity of 119 Pa.s. This result shows that the ability of sodium sulfide to increase the molecular weight of the end polymer was not satisfactorily high when the amount of water added was less than 5 moles per mole of sodium sulfide (see Table 2).

COMPARATIVE EXAMPLE 8

Polymerization was performed as in Example 10 except that $Na_2S \cdot 2H_2O$ was replaced by $Na_2S \cdot 9H_2O$, and no water was added and that the reaction time was 5 hours. The resulting polymer was in the form of small granules; its yield was 92% and it had a melt viscosity of 88 Pa.s. This result shows that the water of crystallization present in the polymerization system did not contribute much to the increase in the molecular weight of the end polymer (see Table 2).

COMPARATIVE EXAMPLE 9

Polymerization was performed as in Example 10 except that a mixture of sodium sulfide, sodium nicotinate and water was heated at 200° C. to achieve partial dehydration and that thereafter, NMP was added to the system which was re-heated at 200° C. to achieve dehydration. The resulting polymer was in powder form; its yield was 94% and it had a melt viscosity of 30 Pa.s, which was lower than the values attained in Examples 10–14 (see Table 2).

COMPARATIVE EXAMPLE 10

Polymerization was performed as in Example 1 except that a mixture of two moles of water per mole of sodium sulfide to be used and sodium nicotinate was dehydrated by heating at 200° C. in NMP, and that thereafter, sodium sulfide and three moles of water per mole of sodium sulfide were added to the mixture, which was re-heated at 200° C. to achieve dehydration. The resulting polymer was in the form of small granules; its yield was 94% and it had a melt viscosity of 97 Pa.s, which was lower than the values attained in Examples 10–14 (see Table 2).

COMPARATIVE EXAMPLE 11

Polymerization was performed as in Example 1 except that sodium nicotinate was added together with p-DCB and NMP after completion of dehydration. The resulting polymer was in the form of small granules; its yield was 92% and it had a melt viscosity of 85 Pa.s, which was lower than the values attained in Examples 10–14 (see Table 2).

As Comparative Examples 6–11 show, the sodium salt of pyridinecarboxylic acid is not highly effective in increasing the molecular weight of the end polymer if it is not present together with NMP, sodium sulfide and a specified amount of water in the reaction mixture to be dehydrated. The advantages of the present invention can be achieved only when the mixture containing the above-specified components is dehydrated.

TABLE 2

| | Added water/$Na_2S$ (molar ratio) | $H_2O/Na_2S$ (molar ratio) after dehydration | Sodium pyridine-carboxylate | Sodium pyridine-carboxylate/$Na_2S$ (molar ratio) | Polymerization temperature (°C.) | Polymerization time (hr) | Yield (%) | Melt viscosity (Pa.s) |
|---|---|---|---|---|---|---|---|---|
| Ex. 10 | 19 | 1.2 | sodium nicotinate | 0.30 | 245 | 10 | 93 | 211 |
| Ex. 11 | 16 | 1.3 | sodium nicotinate | " | 250 | " | 94 | 185 |
| Ex. 12 | 11 | 1.1 | sodium nicotinate | " | 245 | " | 92 | 180 |
| Ex. 13 | 19 | 1.0 | sodium nicotinate | 0.50 | 250 | 5 | 93 | 194 |
| Ex. 14 | " | 1.3 | 6-methyl sodium nicotinate | 0.30 | 245 | 10 | 92 | 176 |
| Comp. Ex. 6 | 0 | 1.1 | sodium nicotinate | " | 230 265 | 2 2 | 96 | 110 |
| Comp. Ex. 7 | 3 | 1.0 | sodium nicotinate | " | 245 | 10 | 94 | 119 |
| Comp. Ex. 8* | 0 | 1.3 | sodium nicotinate | " | " | 5 | 92 | 88 |
| Comp. Ex. 9*2 | 19 | 0.5 | sodium nicotinate | " | " | 10 | 94 | 30 |
| Comp. Ex. 10 | 5*3 | 1.2 | sodium nicotinate | " | " | 5 | " | 97 |
| Comp. Ex. 11*4 | 19 | 1.3 | sodium nicotinate | " | " | " | 92 | 85 |

*1 $Na_2S \cdot 9H_2O$ was used.
*2 A mixture of $Na_2S$, sodium nicotinate and $H_2O$ was dehydrated by heating, followed by addition of NMP and re-heating for dehydration.
*3 A mixture of sodium nicotinate and 2 moles of $H_2O$ per mole of $Na_2S$ to be added was dehydrated by heating in NMP, and thereafter, $Na_2S$ and 3 moles of $H_2O$ per mole of $Na_2S$ were added to the mixture, which was re-heated for dehydration.
*4 After dehydration of $Na_2S$, sodium nicotinate was added together with p-DCB and NMP.

As will be understood from the foregoing description, the process of the present invention allows a poly (p-phenylenesulfide) of increased molecular weight to be produced even if a sodium salt of carboxylic acid is used as a polymerization aid. The resulting poly (p-phenylenesulfide) is suitable for use not only in injection-molding applications but also in producing films, fibers and other shaped articles by extrusion molding.

What is claimed is:

1. A process for producing poly (p-phenylenesulfide) which comprises:
providing a mixture comprising an alkali metal sulfide, a polar aprotic solvent and a carboxylic acid sodium salt represented by the general formula: ZCOONa (wherein Z is a $C_6$–$C_{20}$ aromatic hydrocarbon group), the content of water present in said mixture apart from any water of hydration or crystallization which may be contained in said alkali metal sulfide and carboxylic acid sodium salt being at least about 25 moles per mole of said alkali metal sulfide present;

thermally dehydrating said alkali metal sulfide in said mixture by removing at least part of the water from said mixture wherein about 1 to about 2.4 mols of water per mol of $Na_2S$ remains after dehydration; and then contacting the resulting dehydrated mixture with a p-dihalobenzene so as to produce the intended polymer.

2. A process according to claim 1 wherein the proportion of the water is up to about 50 moles per mole of said sulfide.

3. A process according to claim 1 wherein the carboxylic acid sodium salt is selected from the group consisting of sodium salts of benzoic, o-toluic, m-toluic, p-toluic, o-ethylbenzoic, cuminic, 4-N-propylbenzoic, 2,3,4-trimethylbenzoic, 2,3,4,5-teramethylbenzoic, pentamethylbenzoic, 1-naphthoic, 2-naphthoic, anthracene-1-carboxylic, anthracene-2-carboxylic, anthracene-9-carboxylic, 4-phenylanthracene-1-carboxylic, phenanthrene-1-carboxylic, phenanthrene-2-carboxylic and phenanthrene-9-carboxylic acids, and mixtures of these salts.

4. A process according to claim 1 wherein the alkali metal sulfide is selected from the group consisting of sulfides of lithium, sodium, potassium, rubidium and cesium and mixtures of the listed sulfides.

5. A process according to claim 1 wherein the p-dihalobenzene is selected from the group consisting of p-dichloro-, p-dibromo- and p-diiodo-benzenes and mixtures thereof.

6. A process according to claim 5 wherein the p-dihalobenzene is employed in combination with one or more other dihaloaromatic compounds that are present in a proportion of less than 30 mol % of the p-dihalobenzene.

7. A process according to claim 1 wherein the solvent is selected from the group consisting of N,N-dimethylacetamide, N,N-dimethylformamide, hexamethyl phosphorylamide, N-methyl-$\epsilon$-caprolactam, N-ethyl-2-pyrrolidone, N-methyl-2-pyrrolidone, 1,3-dimethylimidazolidinone, dimethyl sulfoxide, sulfolane, tetramethylurea, and mixtures thereof.

8. A process according to claim 1 wherein the dehydrated mixture is contacted with the p-dihalobenzene at a temperature of about 200°–300° C. for a period of 0.5–30 hours with stirring.

9. A process according to claim 1 wherein the molar ratio of the alkali metal sulfide to p-dihalobenzene used is in the range of from 1.00:0.90 to 1.00:1.10.

10. A process according to claim 1 wherein the polar aprotic solvent is employed in such an amount that 3–60% by weight of the polymer is present in the mixture after polymerization.

* * * * *